(12) United States Patent
Ganapathi

(10) Patent No.: US 7,077,010 B2
(45) Date of Patent: *Jul. 18, 2006

(54) MAGNETORESISTIVE SEMICONDUCTOR PRESSURE SENSORS AND FINGERPRINT IDENTIFICATION/VERIFICATION SENSORS USING SAME

(75) Inventor: Srinivasan K. Ganapathi, Fremont, CA (US)

(73) Assignee: Fidelica Microsystems, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/123,660

(22) Filed: May 5, 2005

(65) Prior Publication Data

US 2005/0199072 A1    Sep. 15, 2005

Related U.S. Application Data

(62) Division of application No. 09/500,706, filed on Feb. 9, 2000, now Pat. No. 6,889,555.

(60) Provisional application No. 60/144,843, filed on Jul. 20, 1999.

(51) Int. Cl.
*G01B 7/16* (2006.01)

(52) U.S. Cl. ........................................ 73/779

(58) Field of Classification Search ............... 73/754, 73/763, 728, 779, 862.69; 324/252
See application file for complete search history.

(56) References Cited

U.S. PATENT DOCUMENTS

| | | |
|---|---|---|
| 3,612,924 A | 10/1971 | Semmelink |
| 3,774,134 A | 11/1973 | Kardashian et al. |
| 3,807,223 A | 4/1974 | Juillerat et al. |
| 4,242,710 A | 12/1980 | Hempstead et al. |
| 4,498,229 A | 2/1985 | Wilmer |
| 4,509,007 A | 4/1985 | Barsotti et al. |
| 4,744,863 A | 5/1988 | Guckel |
| 4,771,638 A | 9/1988 | Sugiyama |
| 4,771,639 A | 9/1988 | Saigusa |

(Continued)

FOREIGN PATENT DOCUMENTS

EP        0650 139        4/1995

(Continued)

OTHER PUBLICATIONS

Markham et al., "Magnetoresistive Measurement of Magnetostriction in Permalloy", *IEEE Trans. Mag.*, 25:5, pp. 4198-4200.

(Continued)

*Primary Examiner*—Max Nori
(74) *Attorney, Agent, or Firm*—Pillsbury Winthrop Shaw Pittman LLP

(57)    ABSTRACT

The present invention is directed to a method of sensing pressure in which applied pressure causes a change in the magnetization vector of a magnetoresistive layer within the device and a corresponding change in resistance. The method includes providing a sensing device with a sensor including plurality of layers, the plurality of layers comprising a non magnetic conducting layer disposed between a magnetoresistive layer with non-zero magnetostriction and a ferromagnetic biasing layer. Once provided, the method then includes sensing a resistance in the plurality of layers upon application of pressure to the sensing device, the applied pressure causing the magnetization vector of the magnetoresistive layer to change and thereby result in a change in resistance.

5 Claims, 4 Drawing Sheets

U.S. PATENT DOCUMENTS

| | | | |
|---|---|---|---|
| 4,809,552 A | | 3/1989 | Johnson |
| 4,884,453 A | | 12/1989 | Hoffmann et al. |
| 5,168,760 A | | 12/1992 | Wun-Fogle et al. |
| 5,206,590 A | | 4/1993 | Dieny et al. |
| 5,304,975 A | * | 4/1994 | Saito et al. ............... 324/252 |
| 5,316,619 A | | 5/1994 | Mastrangelo |
| 5,408,377 A | * | 4/1995 | Gurney et al. ............ 324/252 |
| 5,424,975 A | | 6/1995 | Lowrey et al. |
| 5,427,975 A | | 6/1995 | Sparks et al. |
| 5,442,508 A | | 8/1995 | Smith |
| 5,471,723 A | | 12/1995 | Lauder et al. |
| 5,491,600 A | | 2/1996 | Chen et al. |
| 5,648,885 A | | 7/1997 | Nishioka et al. |
| 5,736,430 A | | 4/1998 | Seefeldt |
| 5,852,670 A | | 12/1998 | Setlak et al. |
| 5,856,617 A | * | 1/1999 | Gurney et al. ............ 324/252 |
| 5,888,845 A | | 3/1999 | Bashir |
| 5,891,586 A | * | 4/1999 | Hasegawa et al. ......... 428/668 |
| 6,124,711 A | | 9/2000 | Tanaka et al. |
| 6,184,680 B1 | | 2/2001 | Shinoura et al. |
| 6,234,031 B1 | | 5/2001 | Suga |
| 6,387,476 B1 | | 5/2002 | Iwasaki et al. |
| 6,408,087 B1 | | 6/2002 | Kramer |
| 6,694,822 B1 | * | 2/2004 | Ganapathi et al. ............ 73/763 |

FOREIGN PATENT DOCUMENTS

| | | |
|---|---|---|
| EP | 0 690 296 | 1/1996 |
| EP | 0 709 829 | 5/1996 |
| WO | WO 98/52135 | 11/1998 |

OTHER PUBLICATIONS

Dee, et al., "Effect of Magnetostriction on Bias Fields in Self Biased MR Heads", *J. Appl. Phys.*, 73:10, 1993, 6232-6234.

* cited by examiner

FIG. 1
(PRIOR ART)
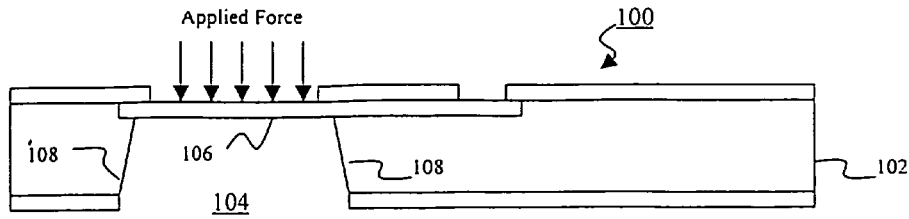
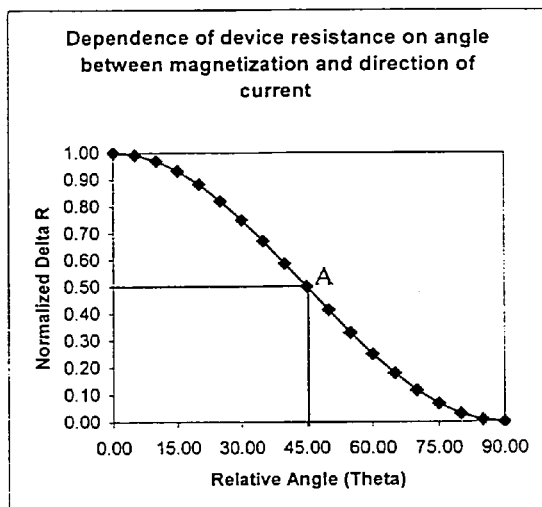
FIG. 2
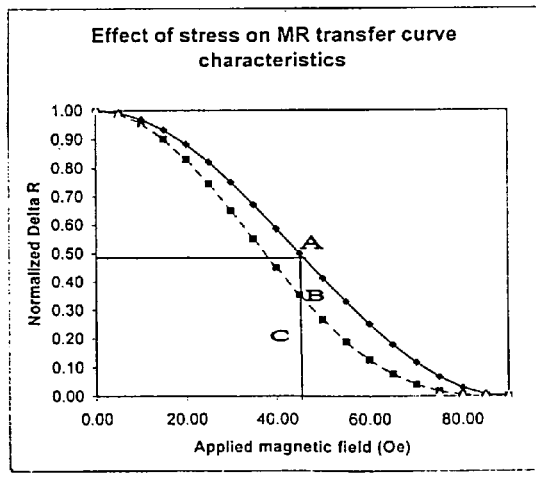
FIG. 4

MAGNETORESISTIVE SEMICONDUCTOR PRESSURE SENSORS AND FINGERPRINT IDENTIFICATION/VERIFICATION SENSORS USING SAME

RELATED APPLICATIONS

This is a divisional of U.S. application Ser. No. 09/500,706 filed Feb. 9, 2000 now U.S. Pat. No. 6,889,555, and is related to and claims priority from U.S. Provisional Application No. 60/144,843 filed on Jul. 20, 1999.

BACKGROUND OF THE INVENTION

1. Field of the Invention

This invention relates generally to the use of microelectromechanical or micromachined devices manufactured by semiconductor processing techniques for the measurement of stress or pressure, and more particularly to the use of magnetoresistive sensors in conjunction with microelectromechanical devices for use as stress/pressure sensors, temperature sensors and magnetic field sensors, including an improved fingerprint sensing device.

2. Description of the Related Art

There are two well known and published types of semiconductor based sensors for pressure sensing. The first is a pressure sensor as described in U.S. Pat. Nos. 5,316,619 and 5,888,845, which describe the use of a capacitor for measuring pressures within sealed chambers. As shown in FIG. 1, the sealed chamber 104 of capacitive sensor 100 has a top defined by a very thin diaphragm 106 of known and fixed length and thickness (length typically in the range of 200 microns and thickness typically in the range of 3–4 microns); a bottom wall (not shown) that is at a fixed predetermined distance from the diaphragm (typically 0.2 micron away), which is essentially composed of the silicon substrate 102, and side walls 108 that support the top membrane. The diaphragm and the bottom of the chamber form the two plates of a parallel plate capacitor. Upon the application of pressure to the diaphragm, it deflects towards the bottom of the chamber, and the reduced spacing between the diaphragm and the bottom of the sealed chamber results in a change in capacitance.

U.S. Pat. No. 5,316,619 teaches some design rules for the dimensions of the diaphragm in order to achieve a certain minimum nominal capacitance, and also to obtain a minimum sensitivity, so as to make the capacitive sensor viable for use as a product. Using these design rules, the required dimensions of the diaphragm are of the order of 500 microns in length and 4 microns in thickness. U.S. Pat. No. 5,888,845 uses similar design concepts and capacitive measurement techniques, but teaches an improved manufacturing process to obtain diaphragms that are substantially thinner, on the order of 0.02–1 micron thick, thereby considerably improving the sensitivity of the sensor.

One of the drawbacks of the above teachings is that the design rules requiring relatively large chamber dimensions are a direct consequence of the low sensitivity of the device to applied pressure. As a result, when the pressure sensors are arranged in a two dimensional array to measure pressure distributions individually at various points, the lateral two dimensional resolution is on the order of 800 microns to 1 mm. This makes the devices unusable if high resolution is required. Reduction of these dimensions to miniaturize the structure will result in reduced sensitivity, fracture of the membrane in response to high pressures, and a starting low nominal capacitance value which increases the noise in the measured signal and therefore makes the measurement less reliable.

A second type of semiconductor based pressure sensors uses the same type of sealed chamber described above, but detects deflection changes using piezoresistive strain elements. The sealed chamber is made on a silicon wafer using similar methods to those described above. The membrane is made with a thickness in the range of 0.1–1 micron, and with a length in the range of 50 micron. Piezoresistive strain gauges are made of p-type silicon that are formed on the membrane. The deflection of the membrane under applied pressure causes changes in the resistances of the strain elements, which can be used to determine pressure.

However, there are several disadvantages with this approach. First, the sensitivity of this device is very low, with a gauge factor, defined by the term $(\Delta R/R)/\epsilon$ (where $\Delta R/R$ is the relative change in resistance, and $\epsilon$ is the strain in the material) of about 120. Second, the thickness of the diaphragm, at 0.1–0.3 micron, is so small that excess pressures will tend to fracture the beam. Third, since silicon is the only piezoresistive material whose properties are well known, characterized, and lends itself to manufacturing, any pressure sensor based on piezoresistance is restricted to the use of silicon substrates. Finally, when the sensors are made in a two dimensional array to measure pressure distributions, the resolution is on the order of 200 microns.

Other patents related to the art of providing semiconductor pressure sensors, but having similar drawbacks to those identified above, include U.S. Pat. Nos. 4,771,638, 4,498,229, 5,427,975, 4,771,639, 5,736,430, 4,809,552, 5,471,723 and 4,744,863.

Use of Pressure to Image Fingerprints

The fingerprint sensing industry uses several different technologies to image fingerprints. The two most prominent technologies are optical based sensors and capacitance based sensors. Optical sensors use a light source, lenses and a prism to image the "ridges" and valleys on a fingerprint, based on differences in the reflected light from the features. The capacitance sensor uses semiconductor type processing to fabricate a two-dimensional array of capacitors. The individual sensors form one plate of the parallel plate capacitor, while the finger itself, when placed on the array, acts as the second plate. Upon contact with the array of sensors, the individual distance from each sensor to the skin is measured using capacitive techniques. The difference in distance to skin at the ridges and valleys of a fingerprint provide the means to replicate the fingerprint.

Both the above techniques fundamentally measure the spacing between the fingerprint features, and the sensor. The difference in spacing provides the means to differentiate between the high points (valleys) and the low points (ridges). The measurement of spacing is inherently subject to several drawbacks: since the height difference between the ridges and valleys is only of the order of 50 microns, any parameter which affects the spacing between the finger and the sensor will affect the measurement. For example, both types of sensors are very sensitive to the thickness of the protective coating. They are also sensitive to oils or grease on the finger, and the presence or absence of moisture on the finger. In addition, most of these sensors are affected by the ambient temperature at the time of sensing. Under very hot or very cold conditions, capacitive sensor can provide erroneous readings.

As a result of the above drawbacks to spacing based reproduction of fingerprints, it would be very useful to be able to use the difference in pressure exerted by the ridges and valleys of a fingerprint on a sensor to replicate the fingerprint image. In principle, a pressure based fingerprint sensor would be impervious to the drawbacks listed above, such as wet or dry conditions on the fingertip, presence of oil or grease on the fingertip, thickness of protective coatings, etc. However, due to the very low sensitivity and inability of the prior art to provide the required resolution, pressure based sensors have not been deployed for the replication of fingerprints.

Accordingly, there remains a need in the art for a microelectromechanical device suitable for use as a stress and/or pressure sensor that has high sensitivity yet can provide high lateral resolution. Moreover, there further remains a need for a sensor that is suitable for use in fingerprint identification and verification that is less sensitive to adverse conditions such as extreme temperatures and skin oils and grease.

SUMMARY OF THE INVENTION

Accordingly, an object of the present invention is to provide a method that uses a microelectromechanical device that overcomes the problems of the prior art.

Another object of the invention is to provide a method that uses a microelectromechanical device that is suitable for stress and/or pressure sensing.

Another object of the invention is to provide a method that uses a microelectromechanical device that is suitable for stress and/or pressure sensing and has high sensitivity.

Another object of the invention is to provide a method that uses a microelectromechanical device that is suitable for stress and/or pressure sensing and can provide high lateral resolution, while simultaneously maintaining mechanical robustness.

Another object of the invention is to provide a method that uses a microelectromechanical device that is suitable for fingerprint identification and verification.

Another object of the invention is to provide a method that uses a microelectromechanical device that is suitable for fingerprint identification and verification and that is less sensitive to adverse conditions such as extreme temperatures and skin oils and grease.

Another object of the invention is to provide a method that uses a microelectromechanical device that is suitable fingerprint identification and verification and that is less sensitive to transient ESD voltages, and also mechanical abrasion.

To achieve these objects and others, the invention provides a method of sensing pressure in which applied pressure causes a change in the magnetization vector of a magnetoresistive layer within the device and a corresponding change in resistance. The method includes providing a sensing device with a sensor including plurality of layers, the plurality of layers comprising a non magnetic conducting layer disposed between a magnetoresistive layer with non-zero magnetostriction and a ferromagnetic biasing layer. Once provided, the method then includes sensing a resistance in the plurality of layers upon application of pressure to the sensing device, the applied pressure causing the magnetization vector of the magnetoresistive layer to change and thereby result in a change in resistance.

BRIEF DESCRIPTION OF THE DRAWINGS

These and other objects and advantages of the present invention, along with the best mode for practicing it, will become apparent to those skilled in the art after considering the following detailed specification, together with the accompanying drawings wherein:

FIG. 1 illustrates a conventional semiconductor pressure sensor;

FIG. 2 is a graph illustrating magnetoresistive characteristics as a function of relative angle between magnetization and current;

FIG. 4 is a graph illustrating the effects of magnetostriction on magnetoresistive characteristics as a function of relative angle between magnetization and current;

DETAILED DESCRIPTION OF THE INVENTION

This invention uses a magnetoresistive element, to realize a pressure sensor with very high sensitivity while maintaining miniaturized dimensions. Magnetoresistive materials and devices have been described in great detail elsewhere (see, e.g. C. D. Mee and E. D. Daniel, "Magnetic Recording, Vol. 1: Technology," McGraw-Hill, New York, 1987, pp. 244–336), and are extensively used in the field of magnetic recording, where the sensor is used to sense small changes in the magnetic field. The present invention exploits the properties of such materials in novel ways for uses in pressure sensors as taught below.

Magnetoresistance is a property of a material that causes the resistance of a material to change upon the application of an external magnetic field. Typically, this characteristic is defined by a parameter called ($\Delta R/R$); the percentage resistance change over the initial resistance. without the presence of an external field. This property is exhibited by many Nickel-based alloys such as Nickel-Iron, Nickel-Cobalt, Nickel-Iron-Cobalt, etc. Fundamentally, this property is related to the fact that if there is a current flow in one direction, the resistance to the flow of current is dependent on the angle between the direction of current flow and the direction of the magnetization of the material. The relationship between the resistance and the angle between the current flow and the magnetization is described by the equation below.

$$R = R_0 - \Delta R \sin^2 \theta \qquad \text{(Equation 1)}$$

where $R_0$ is the (maximum) resistance when the current and the magnetization are parallel to one another, $\Delta R$ is the maximum change in resistance of the material between $\theta=0°$ and $\theta=90°$.

This equation is graphically plotted in FIG. 2, and is commonly referred to as a transfer curve. Typically, the magnitude of $\Delta R/R$ is in the range of a few percent and depends on the choice and thickness of alloy, the presence of epitaxial underlayers, etc.

Figure 3:
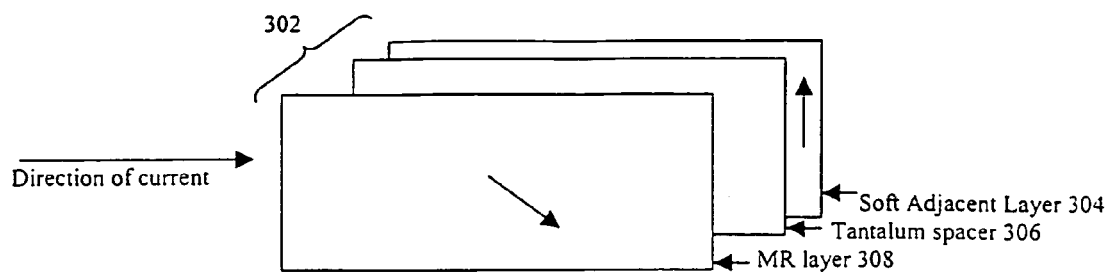
FIG. 3 illustrates a magnetoresistive stack in accordance with the invention.

In magnetic recording applications, where magnetoresistive devices are used to sense magnetic fields, the sensors are operated at the midpoint of the curve on FIG. 2, marked by point A. This is because point A (where the magnetization is at an angle of 45° to the direction of current) is the optimum state to get a linear response on either side of this point to detect small changes in the field in either direction. This is called biasing the MR sensor, and is achieved by placing another thin film of soft magnetic material 304 (typically an alloy of Ni—Fe—Cr, or a laminated layer of CoTaZr and NiFeCr) spaced away from the MR thin film 308, as shown in FIG. 3, with a thin spacer layer 306 in between, such as tantalum, or a laminate of tantalum and another alloy such as NiFeCr. Passage of current through this stack of materials 302 induces a magnetic field and magnetically saturates the soft adjacent layer 304 (as shown by the arrow in FIG. 3), and the free poles at the top and bottom of this soft adjacent layer produce a magnetic "closure" field in the MR layer 308 that causes a vertical magnetization component in the MR thin film 308. In magnetic recording applications, the design is such that the net magnetization of the MR layer 308 is at a 45° angle to the direction of current, as shown by the arrow in FIG. 3.

For magnetoresistive materials, there is another factor that affects the resistance by affecting the magnetization direction of the thin film. This is a combination of the magnetostriction in the material, and the mechanical stress in the material. Magnetostriction is a property that describes the dependence of magnetic properties on the mechanical unidirectional stresses applied to the material (see, e.g., D. Markham and N. Smith, "Magnetoresistive Measurement of Magnetostriction in Permalloy," IEEE Trans. Mag., Vol. 25, No. 5, pp. 4198–4200; R. H. Dee and D. D. King,"Effect of Magnetostriction on Bias Fields in Self-Biased MR Heads," J. Appl. Phys., Vol. 73, No. 10 (1993), pp. 6232–6234). For a material with a finite non-zero magnetostriction coefficient, the mechanical unidirectional stress (or bidirectional stress with a difference in the stress state between the two principal axes) applied to the film affects the intrinsic anisotropy field, and thus the permeability of the material. This in turn causes a change in the slope of the transfer curve. Specifically, the effect of stress on the transfer curve and magnetoresistance of a material with non-zero magnetostriction coefficient is shown in FIG. 4.

The sensitivity of the curves to stress is determined by the magnitude of the magnetostriction coefficient. For a material under a given stress, a small value of magnetostriction coefficient shifts the transfer curve by a small amount, whereas for a material with a large magnetostriction coefficient, the transfer curve is shifted by a large amount. The magnetostriction coefficient of a thin film material can be controlled by composition, thin film deposition conditions, presence and choice of underlayers, annealing conditions, etc. For magnetic field sensing applications such as magnetic storage, the typical value for the magnetostriction coefficient is in the range of $10^{-7}$. However, this value can be made larger depending on the response required from the material.

From FIG. 4, it is apparent that the resistance change upon application of stress can be affected by two factors: the degree of stress in the material, and the magnitude of the magnetostriction coefficient. As either or both of these parameters becomes larger, the response from the sensor changes from the neutral state.

Figure 5:
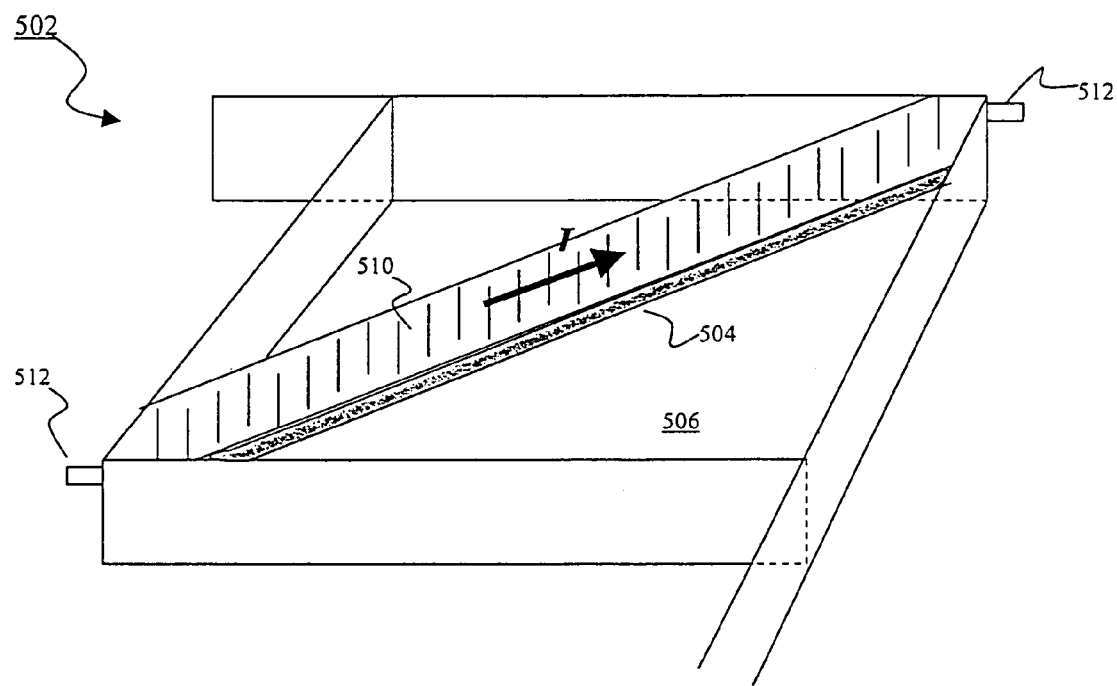
FIG. 5 illustrates a beam or diaphragm substrate on which a magnetoresistive sensor is deposited and patterned in accordance with the invention.

In accordance with an aspect of the invention, a MR material such as stack 302 is the basis for a novel stress or pressure sensor. In order to use it in this manner, the underlying base structure for the MR sensor 502 is fabricated as a suspended bridge, a cantilevered beam or a similar kind of membrane that is supported over a cavity 506 formed in a bulk silicon substrate (as shown in FIG. 5). An example of a method of fabricating this is described in more detail below. An MR stack 510 comprising the soft adjacent layer, the spacer layer and the MR layer is deposited on deformable beam 504, and leads 512 are connected thereto to send current I through it and to sense the resulting voltage. It should be apparent that the support structure for MR layer 510 can be a variety of different structures other than the beam 504 of this example, such as a sealed membrane over an enclosure, or any other form that may be suitable for detecting deflection and stress.

Under the application of a force on the beam 504, it deflects. Note that in this configuration of the beam, the stress direction needs to be either unidirectional or if bidirectional, needs to be different along the two principal axes. If the length of the beam is "l", the width "b", and the thickness "t", for a load per unit length "W", the maximum stress in the beam is $$\sigma_{max}=Mt/2I=(\tfrac{3}{4})(W/b)(l^2/t^2) \quad \text{(Equation 2)}$$

where M is the moment at the center of the beam and I is the moment of inertia about the vertical axis.

The maximum stress and strain occur on the surface of the beam. Since the MR stack 510 is located on the surface of the beam 504, and is a very thin set of films, for calculation and illustration purposes, one can assume that the MR element is subjected to the maximum stress and strain.

Under these conditions, the magnetostriction of the device causes the resistance of the element to shift from point A to point B (in FIG. 4), and is reflected as a change in the potential drop across the MR sensor. Under increased stress, or with the same stress and an increased magnetostriction coefficient, point B now moves to point C on the chart. The difference in resistance between point A and point B (or point C) results in a potential difference across the sensor from the neutral state. Note that in the unstressed state, the device can be made to operate at any point on the curve; however it is desirable to be closer to the middle of the curve to ensure optimum sensitivity and response to pressure. In this way, by measuring the resistance prior to and after the application of stress, the difference in resistance gives a good indication of the magnitude of the stress. If the system is calibrated, this can give an idea of the absolute stress as well as just the presence of a pressure point.

In accordance with an aspect of the invention, the sensitivity of the device as described above exceeds the sensitivity of a capacitance based sensor or a piezoresistive sensor. As a result, considerable miniaturization can be realized with MR sensor 502. With conventional fabrication methods, the MR element can be made as small as one to two microns long while maintaining considerable sensitivity (e.g., >1%). From equation 2, this sensitivity varies directly as the square of the length of the beam, and inversely as the width of the beam, and the square of the thickness. As a result, if the thickness is appropriately tailored for the length of the beam, good sensitivity can be obtained even for beam lengths of 1–2 microns and a thickness of 0.2 micron. It is desirable to make the beam as long as possible within the constraints of the product, because sensitivity only improves with the length of the beam. In contrast, a capacitance based sensor or piezoresistance based sensor would require a beam thickness of the order of a few nanometers for a beam length of 2 micron in order to get any valid signal for small values of applied pressure. This would make the beam very weak from a mechanical standpoint, and make it susceptible to fracture.

Preferably, in order to achieve the maximum sensitivity of the sensor to an applied stress, in addition to designing the beam for maximum deflection under a given load, it is appropriate to choose an alloy and deposition conditions that would ensure a maximum $\Delta R/R$ response from the material, as well as a maximum magnetostriction coefficient. Alloys of Nickel-Cobalt (in the range of 70% Nickel and 30% Cobalt) have been found to exhibit such properties, although to people well versed in the art, other alloys may also be used to obtain such a combination of properties. Another advantage of such alloys is that they also exhibit low resistivity, thus reducing power consumption.

Although the above description has been given with reference to using conventional MR materials, it is possible to make a very similar sensor, or even a sensor with a higher sensitivity, using Giant MagnetoResistive (GMR) materials. GMR materials are essentially multilayer thin films similar to MR stacks, except that the resistance change is induced by relative differences in magnetization directions between different thin film layers within the sensor.

Figure 6:
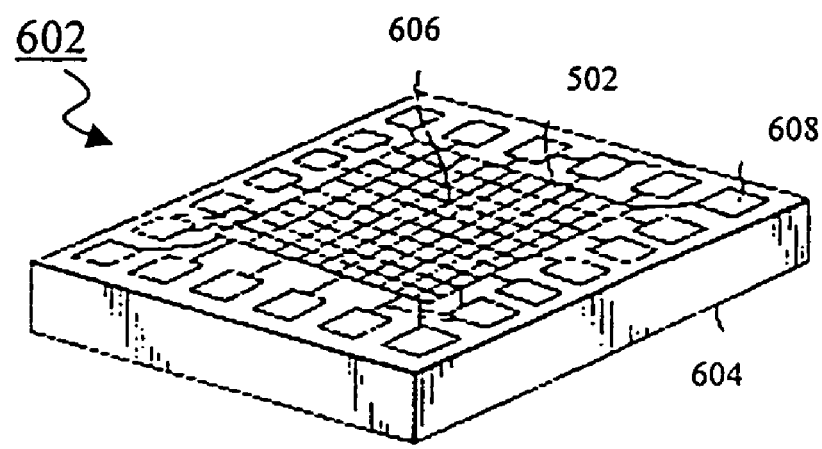
FIG. 6 illustrates a two dimensional array of beams or diaphragms employing magnetoresistive devices such as those illustrated in FIG. 3 for use as pressure sensors in accordance with the invention.

A magnetoresistive semiconductor pressure sensor 602 (that can be used for fingerprint verification/identification, for example) employing a MR sensor 502 as described above will now be described in detail with reference to FIG. 6. Several sensors 502 as described above are placed in an array 606 of m rows by n columns on a substrate 604, with a very fine pitch, and connected to electrodes 608 (using techniques such as that described in U.S. Pat. No. 4,771,638, for example). Because the sensors can be made as small as 1–2 microns in length, the lateral resolution can be as good as 5 microns. For example, when a finger is placed on the array, the ridges on the fingers (which are spaced at about 400–500 microns, and are therefore considerably wider than the sensor pitch in the array), apply a force on the sensors that they come in contact with. The sensors that fall between the ridges experience little to no stress. In this way, one can generate a map of the contact points or the ridges on the fingerprint, and get an accurate reproduction of the fingerprint. However, in practice, the sensor length and pitch can be made greater than 5 microns, since such a good resolution is typically not required for a fingerprint image. Moreover, as the sensor pitch decreases, the processing time for the image increases, since the number of sensors in the image increases as well.

In order to protect the MR sensor during its use as a fingerprint sensor, different schemes may be used. Firstly, for ESD protection, it is relatively simple to coat a layer of insulating material on top of the MR stack, then deposit another layer of a conductive metal (such as Titanium, copper, etc.), whose purpose is to bleed off transient charges caused by ESD. These conductive films need to be grounded, so that the charges from the transient voltage spikes can be bled to ground before they even get to the MR stack layer. This provides another advantage over capacitive techniques, since a conductive layer will affect the capacitance measurement.

Secondly, to protect the MR stack from mechanical abrasion or small impact, a hard coating can be deposited both above and below the conductive ESD protection layer. The thicknesses of all these layers would be in the range of 0.1 µm–5 µm. The material used for the mechanically protective coatings could be a material such as "diamond like carbon" or silicon carbide. These materials can also be tailored to have surface energies such that they are not easily prone to picking up debris or oils from the finger.

Figure 7:
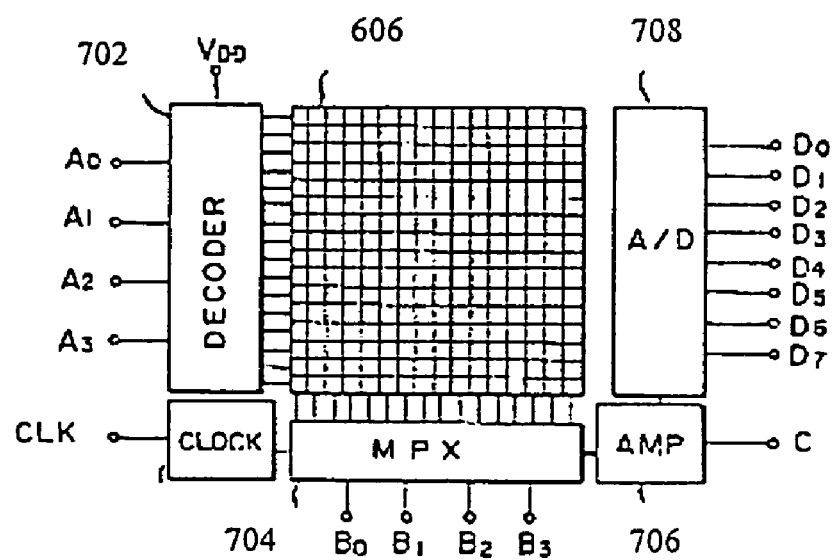
FIG. 7 illustrates an example of circuitry for performing electronic measurement in a two dimensional array of pressure sensors employing magnetoresistive sensors such as that illustrated in FIG. 3 in accordance with the invention.

An example of electronic circuitry and a method that can be used to probe the array 606 sensors 502 either individually or in groups is shown in FIG. 7. It includes a decoder 702, a multiplexer 704, and amplifier 706, and A/D converter 708. The techniques for providing such electronic circuitry and method according to this example are well known and detailed descriptions thereof are not necessary for an understanding of the present invention (e.g., U.S. Pat. No. 4,771,638).

In accordance with an aspect of a method of fingerprint identification/verification in accordance with the invention, however, to determine whether there is a stress on a particular sensor, a baseline is first established with no finger on the sensor, where the "quiescent" resistance of each element of the array is measured. Then the readings are repeated with the finger on the sensor, and the difference in voltages between the "quiescent, unstressed" state and the "stressed" state is calculated to determine the fingerprint pattern. The method of scanning, providing power to each element, conversion of the values from analog to digital, etc are well known and described elsewhere. Note that the baseline can be established either immediately prior to or immediately following the imaging of the fingerprint.

The advantage of the method of this invention is that it always establishes a reference value, which eliminates the effect of ambient temperature, humidity, stress, etc. The prior art, using thermal, capacitive or optical means are unable to obtain a reference each time a measurement is taken, because they depend on the presence of a finger to get a reading each time. Even though the resistance of the sensor changes with temperature, this effect can be automatically compensated for by establishing a reference value, either immediately prior to or immediately following the fingerprint imaging.

It should be apparent to those skilled in the art that since the MR sensor's 502 output depends on a number of factors, it can be used in a variety of alternative ways in this embodiment or other embodiments other than for fingerprint identification/verification. For example, it can be used as a temperature sensor (the resistance of the MR sensor changes by about 0.2–0.5% per degree Celsius change in temperature); it can be used to sense changes in magnetic fields as described above; it can be used to sense current, etc. Also, since the MR sensor has an excellent frequency response, it can be used for high frequency applications where capacitance is not effective.

Figure 8A:
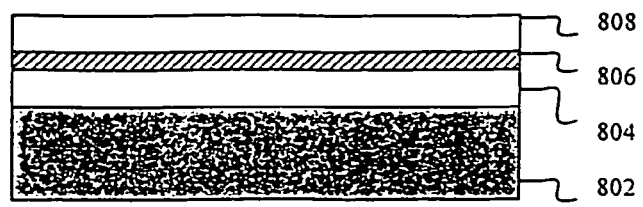
FIGS. 8A–8E illustrate a method for fabricating a beam or diaphragm which would employ a magnetoresistive device such as that illustrated in FIG. 3 for the purpose of pressure sensing in accordance with the invention.
Figure 8B:
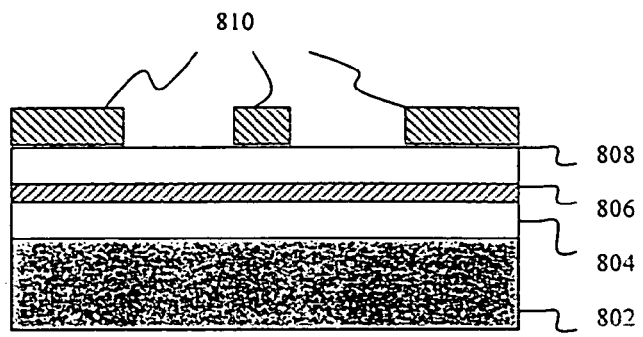
Figure 8C:
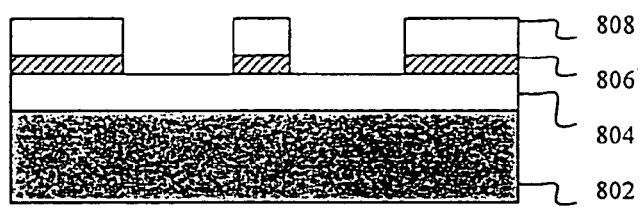
Figure 8D:
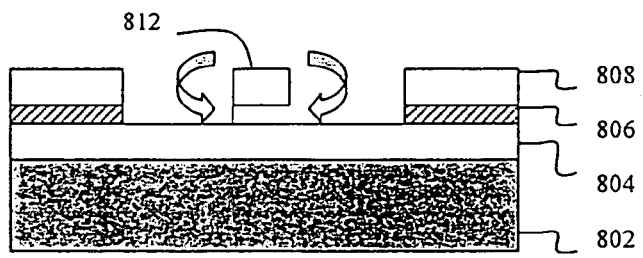

An example of a method for manufacturing a magnetoresistive MEMS (MR MEMS) sensor 502 in accordance with the invention will now be described with reference to FIG. 8. As shown in FIG. 8A, a layer of silicon nitride 804 is first deposited on a silicon substrate 802, then a layer of polysilicon 806, followed by another layer of silicon nitride 808. Then the pattern of the beam is etched using photolithography by depositing a layer of photoresist 810 as shown in FIG. 8B, and etching through at least the top two layers of silicon nitride and polysilicon as shown in FIG. 8C. This is followed by preferentially etching out the second layer of polysilicon underneath the silicon nitride in the beam portion 812, thus forming a simply suspended beam 812 of the upper layer of silicon nitride as shown in FIG. 8D.

Alternatively, using similar techniques as are known in the art, a thin silicon beam or membrane is made by starting from a silicon wafer using conventional processing means as have been described elsewhere in the literature. This is typically done either by etching from the back side using anisotropic etchants, or using single sided wafer processing, by first doping the wafer with n-type doping elements (arsenic), covering with a layer of epitaxial silicon, then etching using a chlorine gas plasma to preferentially etch the N+ region. The preferential etching of the N+ region under the top layer of epitaxial silicon leaves the upper layer suspended as a beam, supported on either side (see, e.g. U.S. Pat. No. 5,427,975).

It should be noted that even though the manufacturing descriptions above are for the processing of silicon, one can use other materials to achieve the same purpose as well. For example, one could use a substrate of Aluminum, coat it with a layer of insulating alumina (using thin film deposition techniques that are well known), sputter another layer of metal (such as aluminum, titanium, copper, etc.). One can now perform photolithography and use dry etching techniques (such as ion milling) to etch down to the underlying layer of aluminum, and then use etchants that are selective to alumina to etch out the underlying alumina layer. In this way, a "bridge" structure of aluminum or other metal can be formed as well.

Figure 8E:
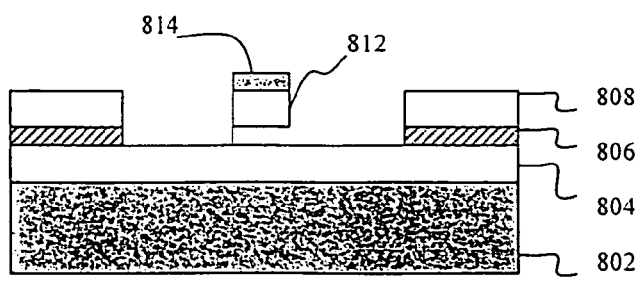

Once the beam is formed, a series of thin films is deposited using thin film techniques (typically a cluster tool), representing the magnetoresistive "stack". This series of materials comprises a Tantalum layer (the underlayer), a layer of Ni—Fe—Cr (which is the soft adjacent layer), another layer of Tantalum, followed by a thin film of Nickel Iron (the MR material). This stack of thin films is deposited on the entire substrate, and therefore will cover the beam, and the exposed portions of the recess under the beam. Only the portions of the stack on top of the beam are the operative portions, hence a photolithographic process is used to either wet etch or dry etch out the portions of the stack that cover the rest of the substrate other than the portion 814 on the bean 812, as shown in FIG. 8E.

Typically, the beam can be made anywhere from 0.2 micron to 20 microns thick; the length of the beam can range from 2 micron to several hundred microns, and the width of the beam can range from 2 micron to several microns. These parameters depend on the mechanical properties of the substrate material used to create the beam, and on the sensitivity required. The beam can be designed to either have "standoff" from the substrate, or can be a free standing structure, with the bottom of the substrate completely etched out.

Although the present invention has been described in detail with reference to the preferred embodiments thereof, those skilled in the art will appreciate that various substitutions and modifications can be made to the examples described herein while remaining within the spirit and scope of the invention as defined in the appended claims. For one example, one could extend the use of piezoresistive sensing techniques in combination with microelectromechanical processing methods as described above to manufacture a fingerprint identification or verification device using piezoresistive methods. In order to do this the "mechanical" beam needs to be made extremely thin and narrow, so that the deflection produced from the beam will still generate enough signal to detect the presence of a ridge on the fingerprint.

What is claimed is:

1. A method of sensing pressure in which applied pressure causes a change in the magnetization vector of a magnetoresistive layer within the device and a corresponding change in resistance comprising the steps of:

providing a sensing device with a sensor including plurality of layers, the plurality of layers comprising a non magnetic conducting layer disposed between a magnetoresistive layer with non-zero magnetostriction and a ferromagnetic biasing layer;

sensing an initial resistance of the device when the pressure to be sensed is not applied to the magnetoresistive layer; and sensing a resistance in the plurality of layers upon application of pressure to the sensing device, the applied pressure causing the magnetization vector of the magnetoresistive layer to change and thereby result in a change in resistance.

2. A method according to claim 1 wherein the sensing device includes a plurality of sensors that are formed and operate together as the sensing device such that each sensor detects the pressure of an area associated with that sensor.

3. A method according to claim 1 further comprising the step of determining the pressure applied to the sensing device, the step of determining using both the initial resistance and the sensed resistance in order to minimize the influence of external conditions on the determined pressure.

4. A method according to claim 3 wherein the sensing device includes a plurality of sensors that are each formed and operate together as the sensing device such that each sensor detects the pressure of an area associated with that sensor.

5. A method according to claim 4 wherein the method senses pressure applied during the obtaining of a fingerprint and further includes the step of using the resistance sensed by each sensor to determine the fingerprint.

* * * * *